United States Patent [19]

Stout

[11] Patent Number: 4,744,252
[45] Date of Patent: May 17, 1988

[54] TRIPLE-MATERIAL STRESS-STRAIN RESISTIVITY GAGE

[75] Inventor: Ray B. Stout, Livermore, Calif.

[73] Assignee: The United States of America as represented by the United States Department of Energy, Washington, D.C.

[21] Appl. No.: 51,560

[22] Filed: May 19, 1987

[51] Int. Cl.$^4$ ............................................. G01B 7/16
[52] U.S. Cl. ...................................... 73/768; 73/794; 73/862.04
[58] Field of Search .................. 73/768, 784, 794, 12, 73/862.04; 364/508

[56] References Cited

U.S. PATENT DOCUMENTS

| | | |
|---|---|---|
| 3,453,873 | 7/1969 | Lambert . |
| 3,543,568 | 12/1970 | Russell . |
| 4,185,496 | 1/1980 | Tisane et al. . |
| 4,429,580 | 2/1984 | Testa et al. ........................... 73/768 |
| 4,546,652 | 10/1985 | Vikar et al. ........................... 73/776 |

Primary Examiner—Jerry W. Myracle
Attorney, Agent, or Firm—L. E. Carnahan; Henry P. Sartorio; Judson R. Hightower

[57] ABSTRACT

A triple material piezoresistive gage provides multicomponent elastic stress or measurements. Thin foils of three piezoresistive materials, e.g. ytterbium, manganin, and constantan, are configured in a nested serpentine rectilinear grid or other grid arrangement and embedded in a medium, preferably normal to the direction of shock wave propagation. The output of the gage is a resistivity change history for each material of the gage. Each resistivity change is independent of the others so that three diagonal components of the elastic stress or strain tensor can be calculated from the resistivity measurements.

17 Claims, 2 Drawing Sheets

TRIPLE-MATERIAL STRESS-STRAIN RESISTIVITY GAGE

The U.S. Government has rights in this invention pursuant to Contract No. W-7405-ENG-48 between the U.S. Department of Energy and the University of California for the operation of Lawrence Livermore National Laboratory.

BACKGROUND OF THE INVENTION

The invention relates generally to stress-strain measurements and more particularly to resistance type strain gages.

In nuclear testing underground gages are needed to obtain measurements that can provide components of the stress response during shock loading in the underground geologic material. Such measurements provide an empirical basis for phenomenological concepts of containment and provide data to validate predictive analysis of the stress history during shock loading. A gage is desired which measures three diagonal components of the elastic stress or strain tensor in a body or formation. Applications of interest include shock wave propagation geometries where multi-components of the stress-strain tensors are to be measured. The value of stress and strain measurements for multi-components of the stress-strain tensors is significant to material testing and validation of material models and computer codes. Use will be extensive in shock loadings.

Strain gages are used to measure mechanical deformation. Resistance (piezoresistance) type strain gages operate on the basis of measuring the change in electrical resistance of a metal wire or foil that results from the change in length caused by the applied stress or strain. A typical gage is constructed of a very fine wire (e.g. 0.001" diameter) or foil of a high resistance metal on a backing material which is cemented to the surface of the structural element. To obtain a higher resistance, the conductor is folded in a zig-zag pattern. Gage resistances are typically 50-5000 ohms and gage sizes from a fraction to several inches. The strain gage is often used in a bridge circuit, e.g. a Wheatstone bridge. As the resistance of the gage changes in response to the stress, the output voltage of the bridge changes, and is measured to determine stress or strain.

However, current gage designs using stress-strain sensitive resistivity material such as ytterbium or manganin are limited to only one response measurement of resistance changes during loading or deformation history. Gages are often surface mounted and provide a measurement of only one-dimensional stress. In a multi-component stress or strain field it is desirable to measure the diagonal components of the stress-strain tensor. However, existin gages measure only one piezoresistance signal from which only one stress component of the stress tensor can be obtained, or possibly the "pressure" in some particular situations. For shock wave applications, the one component piezoresistivity gage is not reliable for stress components that are normal to the direction of shock propagation. Hence it is desired to provide a strain gage for measurements of three diagonal components of the stress-strain tensor in a stress-strain field, and in particula to make measurements normal to a radially propagating shock front.

Illustrative prior art gages include the following:

U.S. Pat. No. 3,453,873 to Lambert discloses a surface mounted strain gage having a plurality of elements located in the quadrants of a measurement plane.

U.S. Pat. No. 3,543,568 to Russel shows a surface mounted vertically stacked strain gage assembly, all of the same material, to produce a higher gain (amplify the output).

U.S. Pat. No. 4,185,496 to Tisone shows a thin film strain gage deposited on the surface of a flexure beam.

U.S. Pat. No. 4,546,652 to Virkar is not a strain gage but a detector having a plurality of conducting strips mounted to the surface of a structure with means for detecting circuit discontinuities caused by cracks in the structure.

SUMMARY OF THE INVENTION

Accordingly it is an object of the invention to provide a strain gage which measures multi-component values of stress or strain.

It is also an object of the invention to provide a strain gage which provides three diagonal components of the stress or strain tensor in a material.

It is another object of the invention to provide a piezoresistive type strain gage for multi-component stress-strain measurement.

It is a further object of the invention to provide a strain gage which is embedded within an object or geologic formation for determining multi-components of the stress-strain tensor.

It is also an object of the invention to provide a strain gage which can make measurements normal to a radially propagating shock front.

The invention is a strain gage made of three stress-strain sensitive resistivity materials to provide three response measurements of resistance changes during loading or deformation history. From the three resistance measurements are calculated three diagonal components of either the elastic strain or elastic stress tensor. The gage is an embedded foil gage which can be oriented normal to a radially propagating shock front in a body or formation. Thin foils of three piezoresistivity materials whose responses are independent are configured in a nested serpentine rectilinear grid. In a stress or strain field, the gage of three materials provides three independent resistance change measurements, i.e. the output of the triple material gage is a resistivity change history for each material in the gage. Each resistivity change is mathematically independent of the others; hence three diagonal components of the stress (strain) tensor can be inferred from the resistivity measurement. The three resistance signals are inverted to give elastic stress or strain signals from which the diagonal components of the stress-strain tensor are calculated. The triple material gage is sensitive to components of the stress-strain tensor when the gage is oriented normal to the direction of shock propagation. A preferred combination of materials for the gage is ytterbium, manganin, and constantan, each of which has a shear independent resistance response.

BRIEF DESCRIPTON OF THE DRAWINGS

DETAILED DESCRIPTION OF THE PREFERRED EMBODIMENTS

Figure 1:
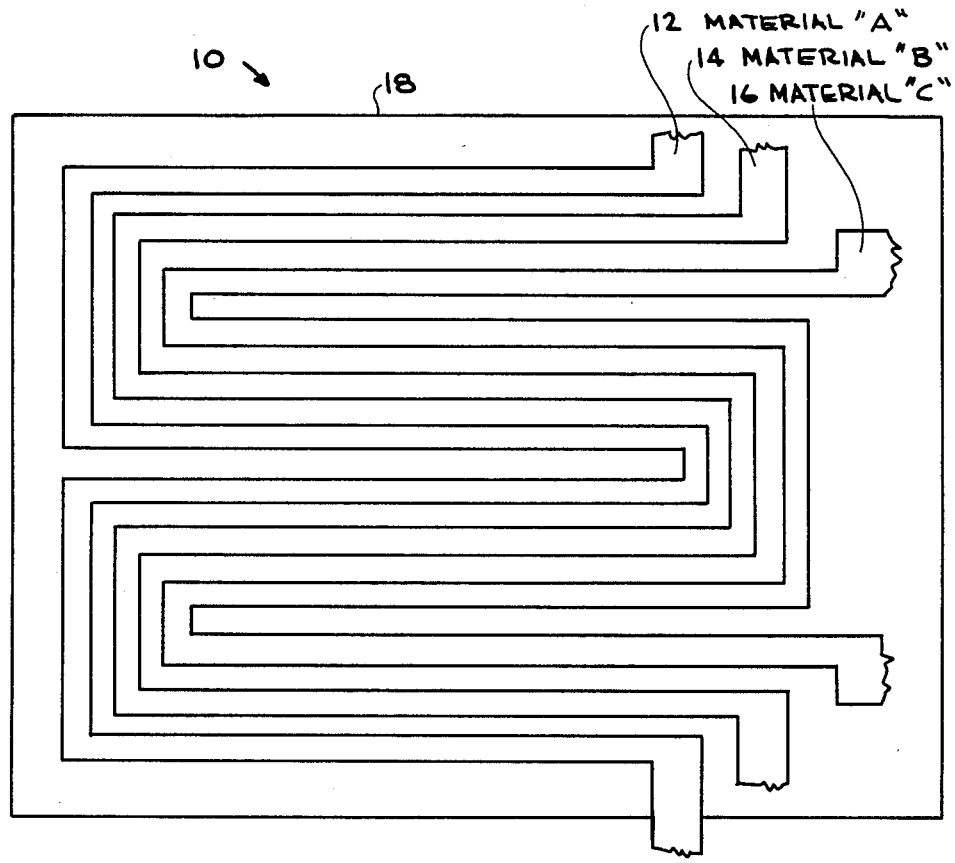
FIG. 1 is a top plan view of a triple foil resistance element of the triple material gage.

A piezoresistive element 10, as shown in FIG. 1, of a triple material resistivity gage according to the invention is formed of three thin continuous foils 12, 14, 16 of three different piezoresistive materials ("a", "b", "c"), mounted on a sheet of backing material 18. The foil materials are all stress-strain sensitive and have an independent change of resistivity response in a stress-strain field. In a preferred embodiment of the invention the three foils are made from ytterbium, manganin, and constantan. The electrical resistivity response of materials such as ytterbium, manganin, and constantan depends on deformation in two distinct ways: (1) there are intrinsic impedance mechanisms to the transport of electrons that depend on interatomic dimensional changes; (2) there is a change in resistivity response of a body from overall geometric changes in the dimensions as the body is deformed. The foils are configured in a nested serpentine rectilinear grid; however, alternate grid configurations are also possible. Wires may also be possible in place of foils but the calculations are more complex because of the change in cross-section from rectangular to elliptical. Thin sheets of a polymer such as Kapton may be used for the backing material; the nested three foil grid may be sandwiched between two sheets or separate foils may be sandwiched between additional sheets in an overlapping fashion. As an illustrative example, the resistive element may be made of 0.012 mm thick foil configured in a 6.35 mm square grid sandwiched between two 0.025 mm Kapton sheets and have a nominal resistance of 50 ohms. Although the invention is described with reference to three foils, additional foils of other materials can also be used.

Figure 2:
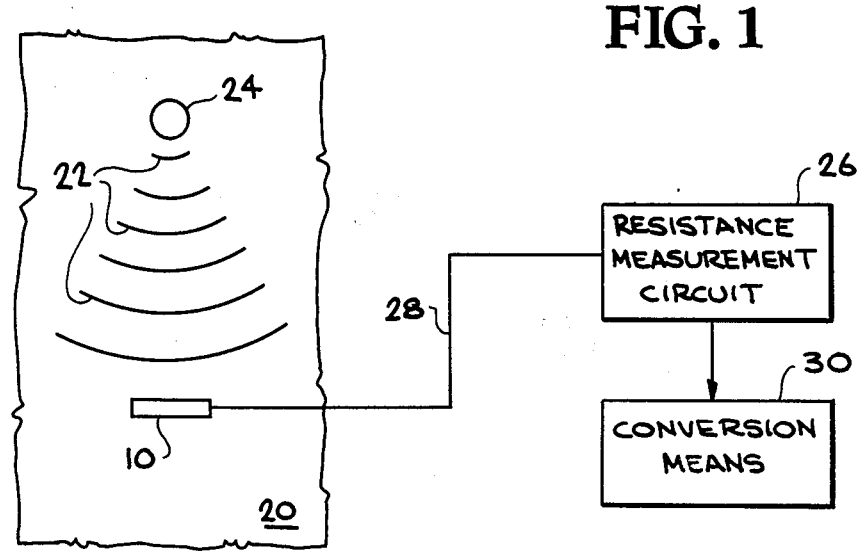
FIG. 2 illustrates a system for measuring stress-strain components using a triple material gage.

A stress-strain measurement system using a triple material resistivity gage is illustrated in FIG. 2. The resistive element 10 is embedded in a body or structure 20 where multiple components of the stress or strain tensor are simultaneously influencing the resistance response of the gage. Stress-strain is created in the medium by shock waves 22 propagating from a source 24 (e.g. an explosive source). In a preferred embodiment, resistive element 10 is oriented normal to the direction of propagation of the shock waves 22. The gage should be well coupled to the surrounding medium so that the gage accurately senses the stress-strain field created in the medium; otherwise the boundary conditions between the gage and medium will affect the measurement. For laboratory tests, chemical explosions were used to generate spherically diverging stress (shock) waves in polymethylmethacrylate (PMMA); PMMA with a density of 1.185 Mg/m$^3$ was used because it is well characterized under dynamic loading conditions and is nonconductive, nonmagnetic, isotropic, and homogeneous. Experiments were conducted using LX04 explosives with 132.6, 34.52 and 17.62 kJ of energy. Spherical shock waves having a discontinuous radial strain component and two equal continuous tangential strain components were generated.

The resistive element 10 is made up of three foils of ytterbium, manganin, and constantan in the nested rectilinear configuration previously described so that all three foils have the same orientation and are at essentially the same point when loaded by a shock wave. The individual foils of resistive element 10 are each connected to resistance measurement circuit 26 by electrical connection 28 and form part of a complete circuit so that the resistance of each foil can be measured as a function of stress or strain applied. The resistivity measurements are performed by the conventional constant current method in which a constant current is supplied to the foil so that the voltage drop across the foil is a measure of the resistance of the foil. In the test experiments, particle velocity is also measured by embedding a conducting foil perpendicular to an imposed magnetic field of known value. The three measured resistivity signals obtained from resistance measurement circuit 26 are then inverted to provide values of the multi-component stress-strain field by conversion means 30 by the methodology further explained herein. Conversion means 30 may include any data processing means for performing the necessary calculations.

Figure 3:
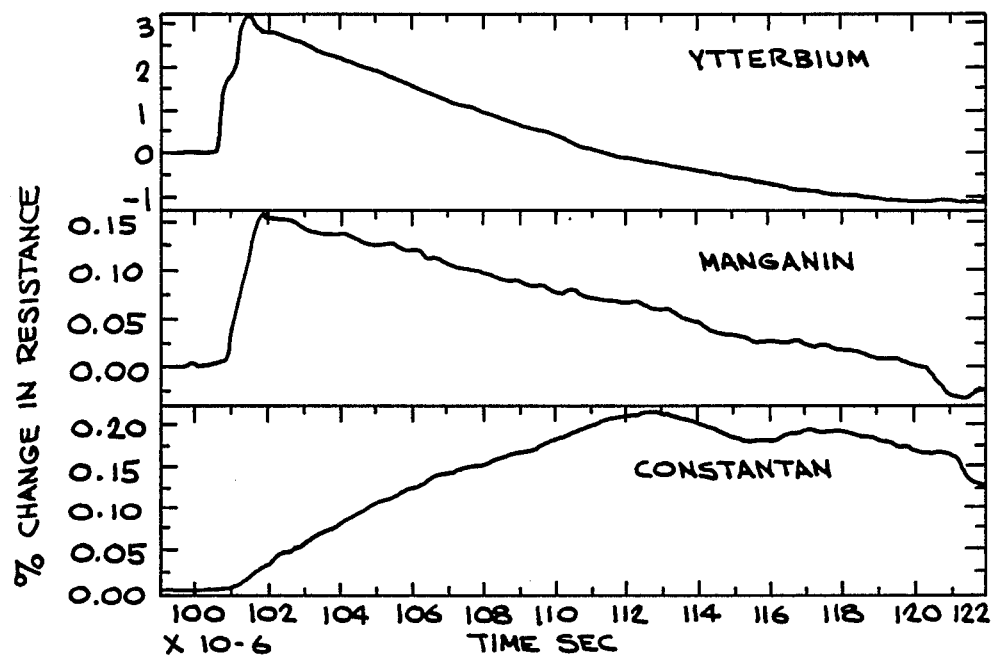
FIG. 3 is a graph of three independent resistance responses from a triple material gage.
Figure 4:
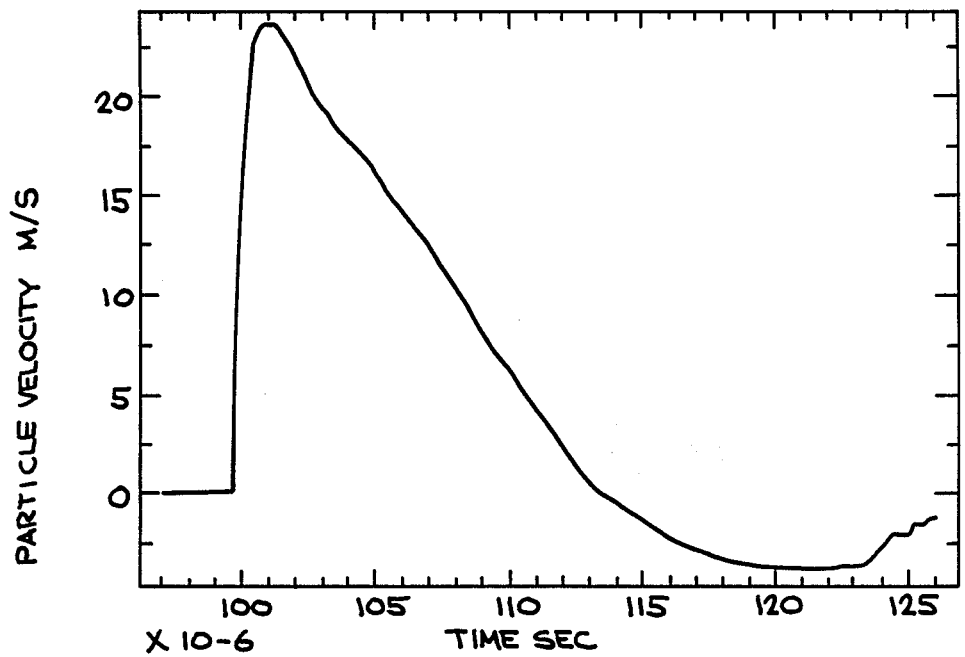
FIG. 4 is a graph of a triangular particle velocity response curve.

A comparison of the responses of the three different materials of the triple element piezoresistance gage is shown in FIG. 3. Each curve shows the percentage change in resistance as a function of time while the shock wave is passing the gage elements. The three responses are totally independent of each other, e.g. the ytterbium and manganin curves are decreasing functions while the constantan is an increasing function, and the ytterbium resistance changes are much greater than the other two materials. The measured particle velocity response is also shown in FIG. 4, and is substantially triangular in shape.

The methodology applies to an elastic medium. The diagonal components of the elastic strain tensor, or the corresponding elastic stress tensor, can be obtained from an isotropic, elastic-plastic, shear-independent resistivity model. The isotropic elasticity relationships for the diagonal strain components are $$\gamma_{11} = ((1+\nu)\sigma_{11} - \nu(\sigma_{11}+\nu_{22}+\sigma_{33}))/E$$
$$\gamma_{22} = ((1+\nu)\sigma_{22} - \nu(\sigma_{11}+\nu_{22}+\sigma_{33}))/E \quad [1]$$
$$\gamma_{33} = ((1+\nu)\sigma_{33} - \nu(\sigma_{11}+\nu_{22}+\sigma_{33}))/E$$

where $\sigma_{11}$, $\sigma_{22}$, $\sigma_{33}$ are the diagonal stress components, and $\nu$ and E are Poisson's ratio and Young's modulus, respectively. The piezoresistance coefficients $\alpha$ and $\gamma$ are related to the intrinsic strain-resistivity coefficients $R_d$ and $R_o$ by $$\alpha = ((1-\nu) R_o - \sigma R_d)/E \quad [2]$$
$$\beta = (1+\nu) (R_d - R_o)/2 \, E$$

or the elastic strain-resistivity coefficients in terms of the piezoresistivity coefficients are $$R_d = (\alpha + 2\beta(1+\nu)/(1+\nu) \, E/(1-2\nu) \quad [3]$$
$$R_d = (\alpha + 2\beta\nu/(1+\nu))E/(1-2\nu)$$

Thus the elastic dependent resistivity response of a foil is determined by the three independent (diagonal) components of stain or the three independent components of stress. A foil gage embedded in a material will sense the three independent components of strain or equivalently of stress. For a constant current through the gage the measured response is the voltage which is directly proportional to the resistance response of the foil. However, a single resistivity history measurement cannot be used to determine uniquely the associated histories of three independent stress or strain components. The triple material gage according to the invention provides three separate and independent measurements of three resistivity responses from which the three components of stress or strain can be calculated as follows.

For three different materials "a", "b", "c", each with intrinsic strain-resistivity coefficients $R_d$, $R_o$, subjected to the same strain history, the strain components $\gamma_{11}$, $\gamma_{22}$, $\gamma_{33}$ can be calculated form the three resistivity changes $\Delta R_a$, $\Delta R_b$, $\Delta R_c$ as follows:

$$\begin{bmatrix} \gamma_{11} \\ \gamma_{22} \\ \gamma_{33} \end{bmatrix} = \begin{bmatrix} \gamma_{R1a} & \gamma_{R1b} & \gamma_{R1c} \\ \gamma_{R2a} & \gamma_{R2b} & \gamma_{R2c} \\ \gamma_{R3a} & \gamma_{R3b} & \gamma_{R3c} \end{bmatrix} \begin{bmatrix} \Delta R_a \\ \Delta R_b \\ \Delta R_c \end{bmatrix} \quad [4]$$

where conversion coefficients are given in terms of the intrinsic strain-resistivity coefficients by $$\gamma_{R1a} = ((R_b^d + 1)(R_d^c + 1) - (R_d^c - 1)(R_o^b - 1))/\det$$

$$\gamma_{R2b} = ((R_d^a + 1)(R_d^c + 1) - (R_d - 1)(R_o^a - 1))/\det$$

$$\gamma_{R3c} = ((R_d^a + 1)(R_d^b + 1) - (R_d^b - 1)(R_o^a - 1))/\det$$

$$\gamma_{R1b} = -((R_d^c + 1)(R_o^a - 1) - (R_o^c - 1)(R_o^a - 1))/\det$$

$$\gamma_{R1c} = -((R_d^b + 1)(R_o^a - 1) - (R_o^b - 1)(R_o^a - 1))/\det$$

$$\gamma_{R2a} = -((R_d^c + 1)(R_o^b - 1) - (R_o^b - 1)(R_o^c - 1))/\det$$

$$\gamma_{R2c} = -((R_d^a + 1)(R_o^b - 1) - (R_o^b - 1)(R_o^a - 1))/\det$$

$$\gamma_{R3a} = -((R_d^b + 1)(R_o^c - 1) - (R_o^b - 1)(R_o^c - 1))/\det$$

$$\gamma_{R3b} = -((R_d^a + 1)(R_o^c - 1) - (R_o^a - 1)(R_o^c - 1))/\det$$

and where the determinant det is given by $$\begin{aligned} \det = &\; (R_d^a + 1)((R_d^b + 1)(R_d^c + 1) - (R_o^b - 1)(R_o^c - 1)) + \\ &\; (R_d^b + 1)((R_d^a + 1)(R_d^c + 1) - (R_o^a - 1)(R_o^c - 1)) + \\ &\; (R_d^c + 1)((R_d^a + 1)(R_d^b + 1) - (R_o^a - 1)(R_o^b - 1)) \end{aligned}$$

For manganin ("a")
 $\nu = 0.374$
 $E = 876$ kb
 $\alpha = -0.44 \times 10^{-3}/\text{kb}$
 $\beta = -0.31 \times 10^{-3}/\text{kb}$
 $R_d^a = 0.51$
 $R_o^a = 0.14$
For constantan ("b")
 $\nu = 0.33$
 $E = 1461$ kb
 $\alpha = -0.49 \times 10^{-4}/\text{kb}$
 $\beta = 1.64 \times 10^{-4}/\text{kb}$
 $R_d^b = -2.51$
 $R_o^b = -2.12$
For ytterbium ("c")
 $\mu = 0.365$
 $E = 120$ kb
 $\alpha = -0.788 \times 10^{-2}$ kb
 $\beta = -1.71 \times 10^{-2}/\text{kb}$
 $R_d^c = -10.57$
 $R_o^c = -7.56$
The determinant det = +61.87.

Thus the three resistance measurements using the triple material gage provide a unique determination of three diagonal components of strain, or equivalently of stress.

For a radially propagating shock wave, in spherical coordinates, for foils oriented with their lengths in the $\phi$ direction, the foils sense resistance changes from the $\sigma_{rr}$, $\gamma_{\phi\phi}$, and $\gamma_{\theta\theta}$ histories. The relationship between resistance change and stress-strain components is given by $$\Delta R_\phi / R = R_r \sigma_{rr} + R_\phi \gamma_{\phi\phi} R_\theta \gamma_{\theta\theta}$$

which for the three materials gives $$\Delta R_a / R_a = R_{ra} \sigma_{rr} + R_\phi a \gamma_{\phi\phi} + R_{\theta a} \gamma_{\theta\theta}$$

$$\Delta R_b / R_b = R_{rb} \sigma_{rr} + R_\phi b \gamma_{\phi\phi} R_{\theta b} \gamma_{\theta\theta}$$

$$\Delta R_c / R_c = R_{rc} \sigma_{rr} + R_{\phi c} \gamma_{\phi\phi} + R_{\theta c} \gamma_{\theta\theta}$$

or represented in matrix form $$\begin{bmatrix} \Delta R_a / R_a \\ \Delta R_b / R_b \\ \Delta R_c / R_c \end{bmatrix} = \begin{bmatrix} R_{ra} & R_{\phi a} & R_{\theta a} \\ R_{rb} & R_{\phi b} & R_{\theta b} \\ R_{rc} & R_{\phi c} & R_{\theta c} \end{bmatrix} \begin{bmatrix} \sigma_{rr} \\ \gamma_{\phi\phi} \\ \gamma_{\theta\theta} \end{bmatrix} \quad [5]$$

The values of the coefficients $R_r$, $R_\phi$, and $R_\theta$ for the three materials of the foils are given in the following table

|  | $R_r$ | $R_\phi$ | $R_\theta$ |
|---|---|---|---|
| ytterbium | $-4.14 \times 10^{-2}$ (kbar)$^{-1}$ | $-4.65$ | $-3.64$ |
| manganin | $-1.97 \times 10^{-3}$ (kbar)$^{-1}$ | $0.35$ | $-1.26$ |
| constantan | $-3.90 \times 10^{-4}$ (kbar)$^{-1}$ | $1.93$ | $-.436$ |

By inverting the matrix the stress and strain components may be calculated from the measured resistance changes. Although a mixture of stress and strain values are obtained, these may be converted to other values through the known relationships between stress and strain. For a linear elastic response, the three non-zero stress components in a spherical geometry are related to the strain components by $$\sigma_{rr} \lambda \gamma + 2\mu \gamma_{rr} \quad [6]$$

$$\sigma_{\phi\phi} = \sigma_{\theta\theta} = \lambda \gamma + 2\mu \gamma_{\phi\phi}$$

where $\gamma$ is the volume strain given by $$\gamma = \gamma_{rr} + 2\gamma_{\phi\phi}$$

and $\gamma_{\phi\phi} = \gamma_{\theta\theta}$ and $\lambda$, $\mu$ are the Lame electricity parameters.

Changes and modifications in the specifically described embodiments can be carried out without departing from the scope of the invention which is intended to be limited only by the scope of the appended claims.

I claim:

1. A stress-strain gage comprising three thin foils of different stress-strain sensitive resistivity materials to provide three independent response measurements of resistance changes.

2. The gage of claim 1 wherein the three foils are made from ytterbium, manganin, and constantan.

3. The gage of claim 2 wherein the three foils are configured in a nested serpentine rectilinear grid.

4. The gage of claim 2 further including means operatively connected to the foils for separately and simultaneously measuring the resistance of each foil.

5. The gage of claim 1 wherein the three foils are configured in a nested serpentine rectilinear grid.

6. The gage of claim 5 further including means operatively connected to the foils for separately and simultaneously measuring the resistance of each foil.

7. The gage of claim 1 further including means operatively connected to the foils for separately and simultaneously measuring the resistance of each foil.

8. The gage of claim 1 wherein the three foils are mounted on a backing material.

9. The gage of claim 1 wherein the three foils are embedded in a body or structure wherein a multi-component stress-strain field is produced.

10. The gage of claim 9 wherein the three foils are oriented normal to a shock wave propagating through the body or structure.

11. A stress-strain measurement apparatus for determining multi-components of a stress-strain tensor in a multi-component stress-strain field, comprising:
a piezoresistive element comprising a plurality of thin foils of different stress-strain sensitive resistivity materials;
resistance measurement means operatively connected to the piezoresistive element to provide independent response measurements of resistance changes;
conversion means associated with the resistance measurement means for converting the measurements of resistance changes to components of the stress-strain tensor.

12. The apparatus of claim 11 comprising three foils made from ytterbium, manganin, and constantan.

13. The apparatus of claim 11 wherein the foils are configured in a nested serpentine rectilinear grid.

14. A method of measuring multi-component stress or strain tensor in a multi-component stress or strain field in a body or structure, comprising:
embedding a piezoresistive element comprising a plurality of thin foils of different stress-strain sensitive resistivity materials in the body or structure;
making simultaneous independent response measurements of resistance changes of the thin foils of the piezoresistive element;
converting the measurements of resistance changes to components of the stress-strain tensor.

15. The method of claim 14 further comprising forming the piezoresistive element of three foils of ytterbium, manganin, and constantan.

16. The method of claim 14 further including orienting the piezoresistive element substantially normal to a shock wave propagating through the body or structure.

17. The method of claim 14 further including forming the foils into a nested serpentine rectilinear grid.

* * * * *